Figure 1:
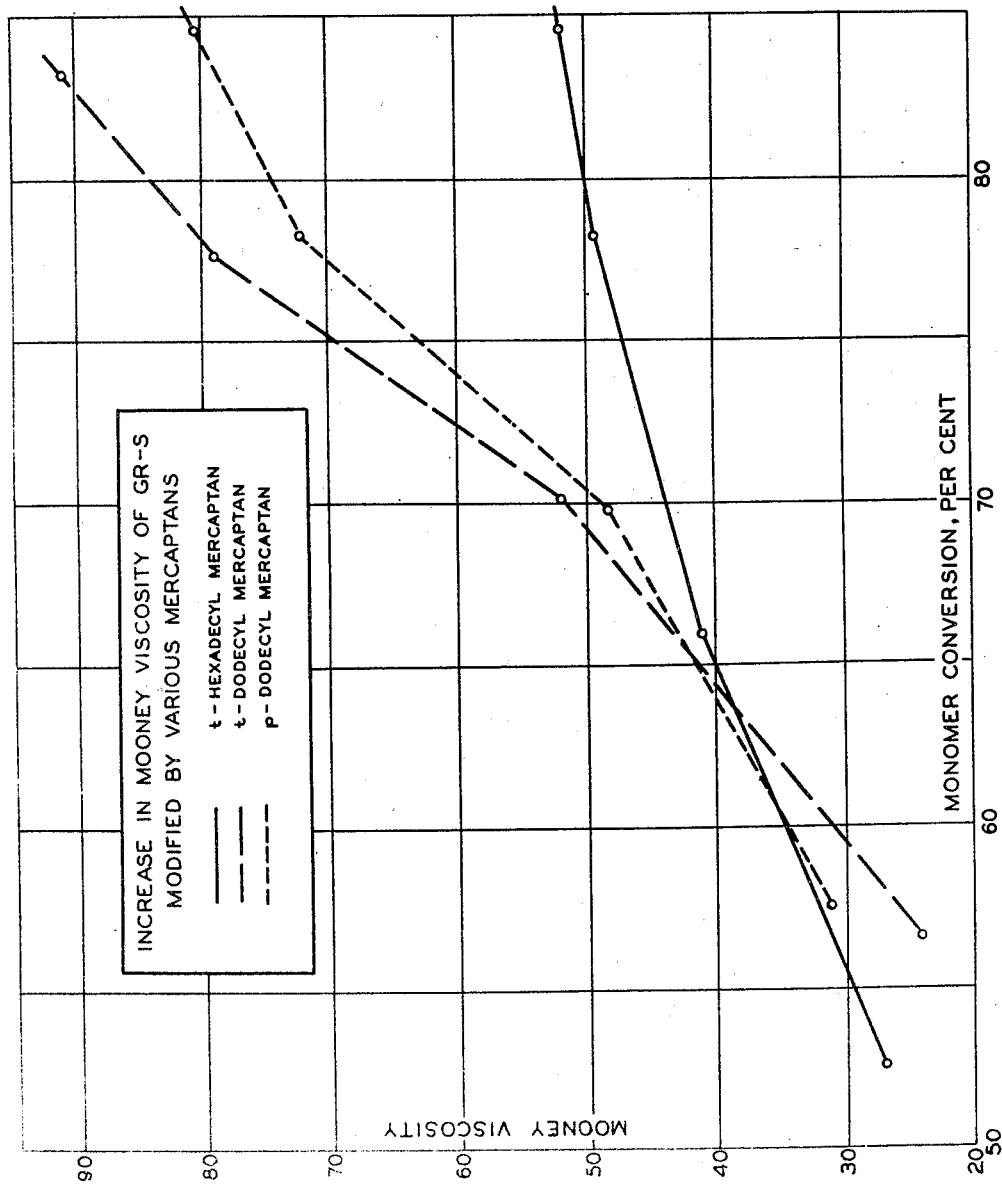

Patented Jan. 3, 1950

2,493,268

UNITED STATES PATENT OFFICE 2,493,268

PROCESS OF COPOLYMERIZING BUTADIENE AND STYRENE

Walter A. Schulze and Willie W. Crouch, Bartlesville, Okla., assignors to Phillips Petroleum Company, a corporation of Delaware Application May 4, 1945, Serial No. 591,868

3 Claims. (Cl. 260—84.3)

This invention relates to the production of polymers of high molecular weight. It is particularly applicable to the production of synthetic rubber by the polymerization of polymerizable organic compounds in an aqueous emulsion. In one of its more specific aspects this invention relates to the use of high molecular weight tertiary mercaptans as modifying agents in emulsion polymerization of butadiene-styrene and other related comonomer systems whereby the quality of the polymerizates is greatly improved.

Synthetic rubber is made by polymerization of polymerizable organic compounds under controlled polymerization conditions. The term synthetic rubber is used broadly to include the polymerizates of olefins, diolefins, styrene and its derivatives, alkyl esters of acrylic and alkacrylic acids (such as methyl methacrylate), and other compounds having at least one active vinyl group ($CH_2=C<$). These compounds are polymerized alone or in admixture with one another to form products having some of the characteristic properties of synthetic rubber. When a mixture of two or more of these compounds is subjected to polymerization conditions, a copolymer is formed in which the components form high molecular weight molecules by the linking together of the different individual component monomers. We have found that the synthetic product produced by the polymerization of a polymerizable organic compound is improved by the addition of a specific tertiary aliphatic mercaptan to the monomeric compound to be polymerized prior to the polymerization thereof. This is particularly effective in the polymerization of butadiene in an aqueous emulsion with suitable comonomers, for example, styrene, derivatives of styrene containing an active vinyl group ($CH_2=C<$), acrylonitrile, methacrylonitrile, methyl acrylate, methyl methacrylate, etc., to form copolymers. Buna-S (or GR–S) is an example of the most important synthetic rubber so produced at the present time.

It is well known that copolymers of the GR–S type are unsuited for conversion into synthetic rubber unless the emulsion polymerization is carried out in the presence of certain additive substances designated as modifying agents. The general function of modifiers is to eliminate or to substantially reduce the formation between polymer units of cross-linkages leading to the production of gel-type products which render the polymerizates deficient in desirable rubber-like properties. The most effective modifying agents heretofore known to the art have been selected alkyl mercaptans and especially the primary alkyl mercaptans having about 12 carbon atoms per molecule.

In order to fully understand the advantages of the present invention a summary of conventional polymerization technique as employed in the production of GR–S rubber is herewith presented. An emulsion is prepared by suitably agitating the following recipe:

| | Parts |
|---|---|
| Butadiene | 75 |
| Styrene | 25 |
| Soap | 5 |
| Potassium persulfate | 0.3 |
| Water | 180 |
| Mercaptan | Variable |

Polymerization is effected at a temperature of 50° C. for a period of about 12 hours while maintaining a good state of emulsification. The resultant latex is treated with an antioxidant such as phenyl-beta-naphthylamine which is followed by treatment with a coagulant such as brine-acid solution. The crude polymer is then washed and dried in preparation for evaluation and subsequent process steps.

An object of this invention is to provide an improved process for the production of high molecular weight polymers. Another object of this invention is to provide an improved process for the polymerization of polymerizable organic compounds in an aqueous emulsion. Still another object is to provide such a process which is particularly useful for the production of synthetic rubber of the GR–S type. A further object is to provide such a process by means of which GR–S synthetic rubber of superior characteristics may be produced. A still further object is to provide such a process in which a high molecular weight tertiary aliphatic mercaptan is used as a modifier for polymerization of monomers in an aqueous dispersion.

Figures 1 to 4 of the drawings illustrate graphically comparative physical properties of GR–S polymers produced by emulsion polymerization of butadiene and styrene under comparable conditions.

This invention is particularly concerned with the use of a specific group of tertiary aliphatic mercaptans as modifiers in emulsion polymerization systems. While aliphatic mercaptans, in general, have been proposed for this purpose, we have found that entirely new and unexpected results are realized when the present mercaptan compositions are employed for this purpose. Inasmuch as our novel compositions are comprised of a great number of complex isomeric mercaptans, they are characterized on the basis of physical and chemical properties and by their method of preparation. The present mercaptans are derived from mixtures of isomeric olefins of structure such that on catalytic addition of hydrogen sulfide, mercaptans of tertiary configuration are obtained exclusively. The unusual modifying action, hereinafter described, is characteristic of tertiary mercaptans having a molecular weight range from about 244 to about 260 and comprising mainly $C_{16}$ mercaptans, although some t.-$C_{15}$ and t.-$C_{17}$ mercaptans may be included due to the extensive overlapping in boiling points of the great number of possible mercaptans in this boiling range. Throughout the present disclosure our preferred mercaptan compositions are referred to as tertiary-hexadecyl mercaptans. While pure tertiary mercaptans in the above molecular weight range are desirable, purification difficulties are such that the use of fractionated hydrocarbon-mercaptan mixtures is expedient. The presence of substantially inert hydrocarbon diluents is without measurable deleterious effect on the modifying action of the aforesaid t.-hexadecyl mercaptan compositions. The following tabulation presents physical constants of compositions that may be considered equivalents on the basis of available mercaptan content.

*Tertiary-hexadecyl mercaptan concentrates*

|  | (1) | (2) | (3) |
|---|---|---|---|
| Mercaptan content, per cent | 49.5 | 80 | 99.0 |
| Av. molecular wt | 259 | 249 | 251 |
| RSH sulfur, wt. per cent | 6.1 | 10.3 | 12.6 |
| Distillation, °F.[1] | (5 mm.) | (5 mm.) | (1.6 mm.) |
| First drop | 247 | 252 | 218 |
| 50% Cond | 264 | 267 | 269 |
| 80% Cond | 285 | 287 | 278 |
| 90% Cond | 314 | 305 | 289 |
| 95% Cond | dec. | dec. | dec. |

[1] Rubber Reserve Company Test Method L. M. 2.5.6.

The quantity of modifier used in any given recipe is dependent on the type of mercaptan or mercaptans used and is determined by experiment. However, regardless of the modifier employed certain well established conditions must obtain at the completion of polymerization among which may be mentioned the following:

(a) Approximately 77 per cent conversion of the monomer charge;

(b) The production of polymers having Mooney viscosity in the range, 45–55;

(c) The production of polymers of adequately high molecular weight and substantially free of benzene insoluble gels.

The present invention is particularly concerned with the role played by modifiers with respect to the above criteria and the new and unexpected advantages resulting from the application of the mercaptan modifier composition of the present disclosure.

With respect to extent of monomer conversion, it is usually not considered economically feasible to proceed much beyond the 77 per cent value due to the greatly decreased reaction rates prevailing at higher conversion levels. On the other hand it is necessary to realize an adequately high conversion in order to obtain maximum benefit from equipment investment and to reduce costly monomer recovery and recycle operations. Regardless of extenuating economic considerations it is mandatory that a polymer of Mooney viscosity in the range of 45–55 be produced. In Fig. 1 the rate of change of Mooney viscosity with extent of monomer conversion is depicted graphically for two commercial mercaptan modifiers and for the tertiary-hexadecyl mercaptan modifier of the present invention. It is noted that the tertiary and primary dodecyl mercaptan modifiers result in polymers of rapidly increasing viscosity above about 65 per cent conversion. It is obvious therefore that extremely accurate control is necessary in order to stop the reaction before the allowable Mooney viscosity is exceeded. A latitude of from 4 to 6 per cent on the conversion scale is indicated for these widely used modifiers. Applicants' tertiary hexadecyl mercaptan composition is not limited in this manner. Referring to Fig. 1 again it will be seen that with the $C_{16}$ mercaptan modifier, the reaction may be stopped anywhere between the 70 and 86 per cent conversion levels with the production of polymers of acceptable Mooney viscosity. The flat slope of the Mooney viscosity vs. conversion curve of polymers modified by the tertiary-hexadecyl mercaptan composition in accordance with our invention is seen to have great utility in the control and production of synthetic rubber polymers. Furthermore, it is known that the commercial primary dodecyl mercaptan modifier contains appreciable quantities of primary $C_{16}$ mercaptan yet the polymer viscosity slope is radically different from that of polymers of this invention. Furthermore, since the tertiary nature of the other $C_{12}$ mercaptan resulted in even greater variance, it becomes apparent that applicants' results cannot be predicted on the basis of homology. While it is necessary to determine the optimum amount of modifier by experiment, any such variations will merely shift the curves along the conversion axis leaving the slopes of the curves qualitatively unchanged.

Figure 2:
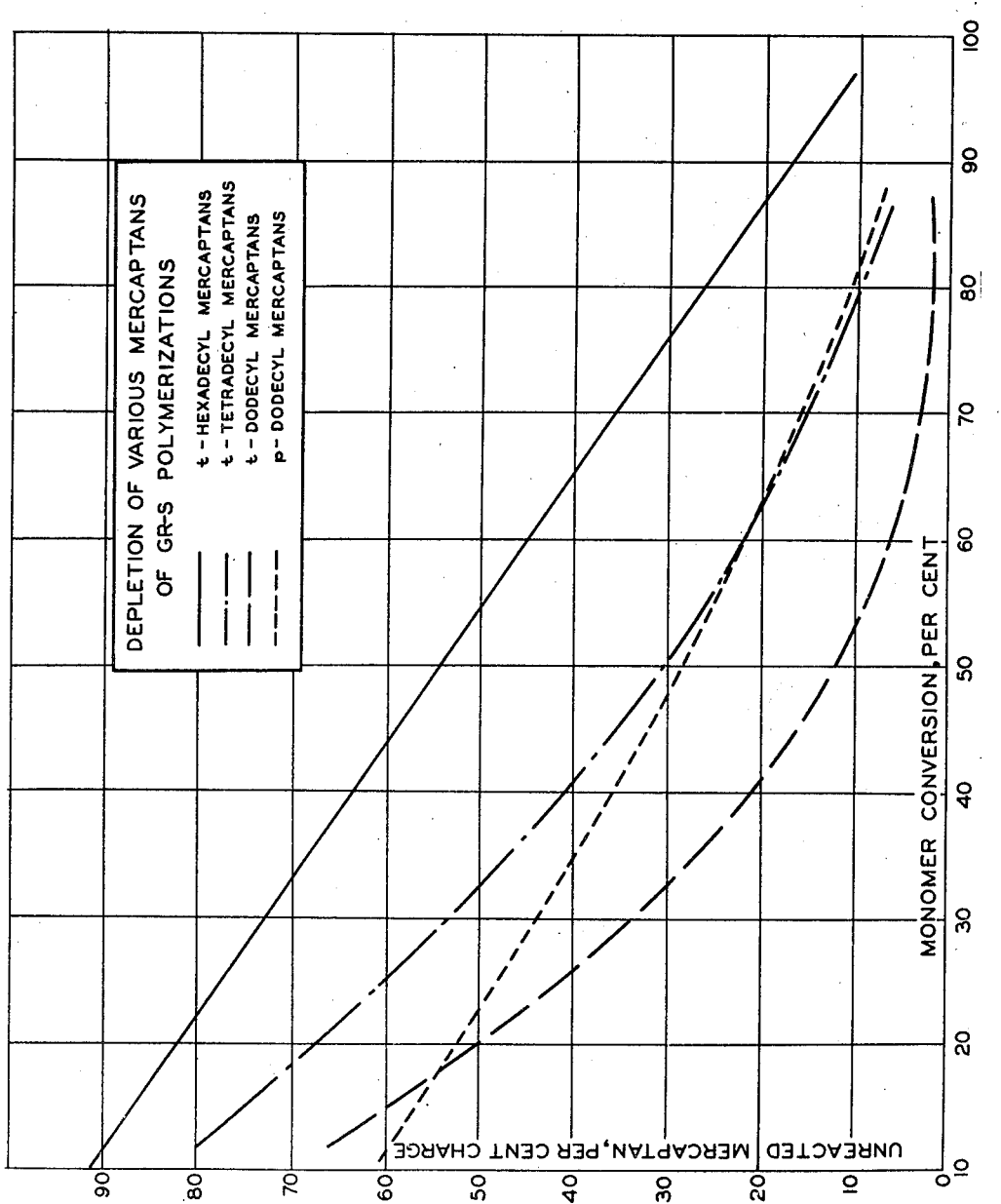

The unusual benefits realized in emulsion polymerization from the employment of the tertiary-hexadecyl mercaptan composition of our invention is due at least in part to the high concentration of mercaptan available for modification purposes at all stages of conversion. In Fig. 2 a plot of unreacted mercaptan versus per cent of total monomers converted is presented. In the cases involving modification with primary dodecyl mercaptan, tertiary-dodecyl mercaptan and tertiary-tetradecyl mercaptan, a rapid rate of depletion occurs at low conversion levels. However, with the tertiary $C_{16}$ mercaptan of the present invention a straight line curve is obtained indicating that the rate of mercaptan depletion is substantially independent of polymer conversion. As a consequence of the unexpected behavior of the modifier composition of our invention at the 77 per cent conversion level, approximately 29 per cent of the original modifier charge is still available for reaction, thereby obviating any possibility of producing an under-modified polymer due to operational irregularities. At the same point of conversion only 3 per cent of tertiary $C_{12}$ mercaptan, 11 per cent tertiary $C_{14}$ mercaptan and 13 per cent primary $C_{12}$ mercaptan remain available for modification purposes.

In order to produce polymerizates suitable for conversion into high-quality synthetic rubber it is essential for the polymers to have a high average molecular weight, preferably above 300,000, and at the same time to be free of gel. In this connection it has been demonstrated by Kemp and Straitiff (Ind. Eng. Chem. 36, 707 (1944)) that the most desirable polymers of the Buna-S type are those which do not contain large amounts of material of either very high or very low molecular weight. We have now found that through the action of our tertiary-hexadecyl mercaptan modifier composition a degree of molecular weight uniformity can be attained which heretofore has been impossible through the application of known commercial mercaptan modifiers. Thus with prior art modifiers, the rate of depletion of mercaptan is such that an over-modified polymer of inadequate chain length is produced in the early stages of polymerization. Since excessive quantities of modifier have been consumed, cross-linking sets in during the final phase of polymerization as is evidenced by a very rapid rise in average molecular weight. Although both over- and under-modification have resulted, the average molecular weight of the final product is sufficiently high to permit processing operations; however, such polymers have poor aging properties and otherwise fall short of an ideal synthetic rubber. This lack of control over the rate of reaction of modifier results in a product containing a proportion of polymer of objectionably low molecular weight and another portion having excessively high values. This well-known status of the art is illustrated graphically in Fig. 3 where polymer intrinsic viscosities have been plotted against extent of monomer conversion for GR-S product modified with $C_8$, $C_{12}$ and $C_{14}$ tertiary aliphatic mercaptans. Since it is well known that intrinsic viscosity is a measure of molecular weight, the direct experimental viscosity values are used in place of the more cumbersome corresponding molecular weights. In this homologous group of tertiary mercaptan modifiers the similarity in the characteristics of the curves is obvious. In all instances an over-modified low-molecular weight polymer is produced at conversions below 50 per cent while a rapid transition occurs from relatively low to relatively high molecular weight materials in the range lying between 50 and 77 per cent conversion of monomers. Above about 80 per cent conversion the formation of gel results in a decrease in benzene solubility and a consequent rapid apparent decrease in molecular weight.

Figure 4:
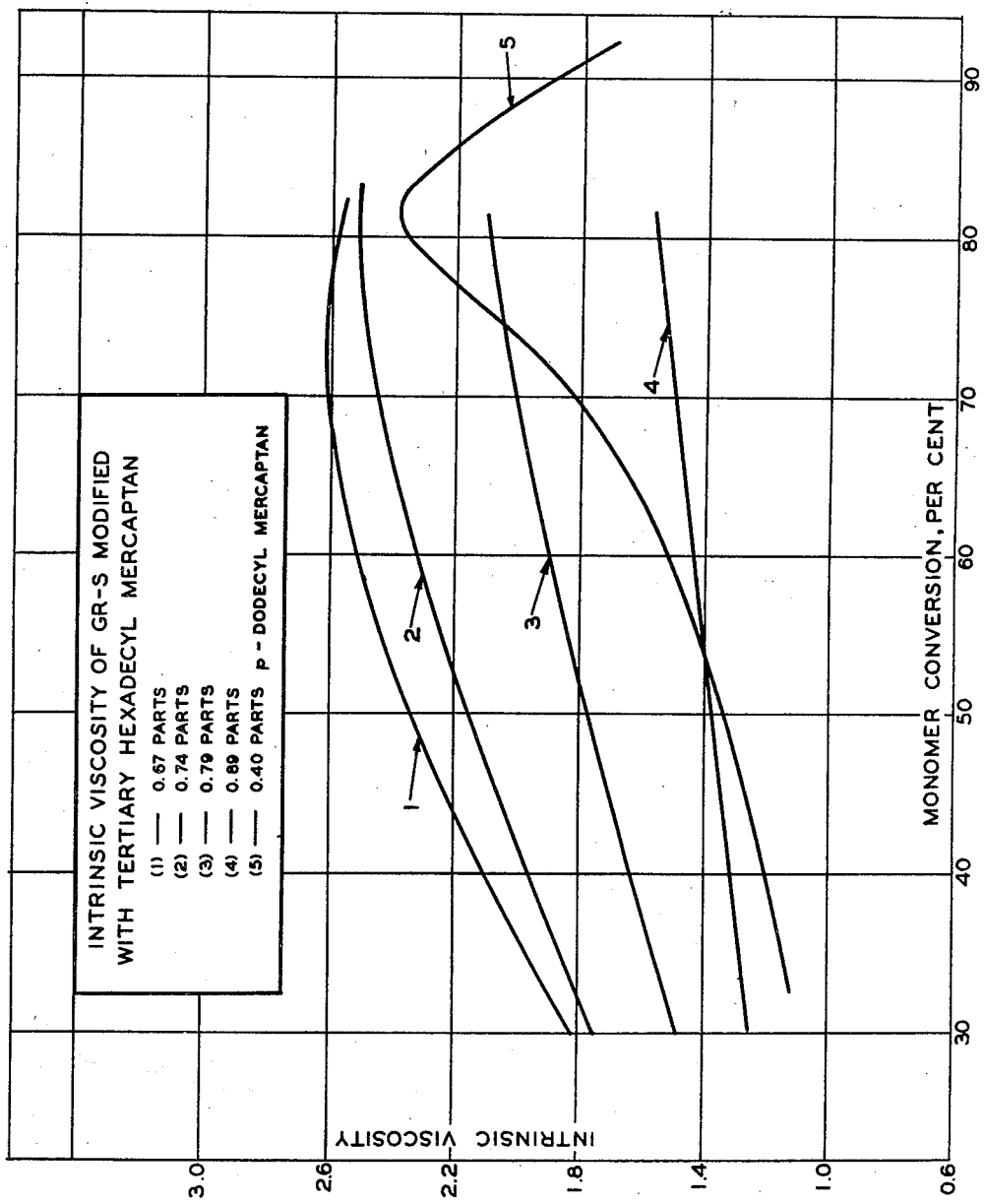

The most outstanding contribution of our invention to the polymerization art is the achievement of a remarkably uniform distribution of polymer sizes thereby improving the characteristics of the polymers with respect to milling, compounding, vulcanization and wearing properties. This improvement in uniformity is illustrated in Fig. 4 where polymer intrinsic viscosity versus monomer conversion curves are presented for various concentrations of tertiary-hexadecyl mercaptan modifier. In the same figure a curve representing polymer modified with a widely used commercial primary dodecyl mercaptan is shown for purposes of comparison. The uniformity in molecular weight of polymers modified with our preferred tertiary mercaptan is quite obvious. It would also appear that using between 0.75 and 0.80 part of tertiary $C_{16}$ mercaptan in the standard GR-S recipe, a workable polymer could be obtained at conversions virtually anywhere between about 40 and 80 per cent monomer conversion. This is obviously not the case in mercaptan modifiers heretofore known to the art.

Example I

Twelve-ounce bottles were charged with the conventional GR-S recipe using various t.-$C_{16}$ mercaptan modifier charges in order to determine the optimum modifier charge necessary to produce a polymeric product having a Mooney viscosity within the range of 45-55. Polymerization with constant agitation was carried out in a constant temperature bath at 50° C. for a period of 11 hours. The bottles were then opened and 0.20 part hydroquinone added. The latices were steam stripped under diminished pressure to remove unreacted monomers, phenyl-beta-naphthylamine inhibitor was added and the product coagulated with brine-acid. The polymers were dried and subjected to Mooney viscosity determinations. Pertinent data are tabulated below.

| RSH Concentrate, Parts | Effective RSH, Parts | Polymer Yield, Per Cent | Mooney Viscosity |
|---|---|---|---|
| 1.8 | 0.89 | 75.3 | 37.0 |
| 1.6 | 0.79 | 76.0 | 47.4 |
| 1.4 | 0.69 | 76.1 | 63.5 |

From these data it may be concluded that 0.75 to 0.80 part of tertiary-hexadecyl mercaptan per 100 parts of monomers is required to produce a polymer of requisite Mooney viscosity in the GR-S recipe.

Example II

A series of polymerization runs were carried out using varying quantities of tertiary-hexadecyl mercaptan modifier in the GR-S formula in order to determine the optimum concentration range of the modifier with respect to ultimate molecular weight (intrinsic viscosity) and uniformity of polymer size at various stages of monomer conversion. The standard recipe was charged to twelve-ounce bottles equipped with crown caps bearing self-sealing gaskets. Excess butadiene was charged and allowed to vent through a hypodermic needle, while the bottle rested on a balance, until the proper weight was reached. The bottles were then agitated in a constant temperature bath held at 50° C. During the progress of polymerization, samples of latex were removed periodically through a hypodermic needle inserted into the bottle while the latter was held in an inverted position. Samples of about 20 grams of latex were thus taken, inhibited with 0.1 gram of phenyl-beta-naphthylamine, coagulated with alum and dried at 150° F. The extent of conversion of each sample was determined from the weight of latex taken and the weight of dried polymer, corrected for antioxidant and fatty acid. The results of these tests are shown in Fig. 4. It will be noted that the optimum amount of modifier lies in the range of about 0.75 to 0.80 part per 100 parts of monomers, which agrees with the determinations based on Mooney viscosities.

Figure 3:
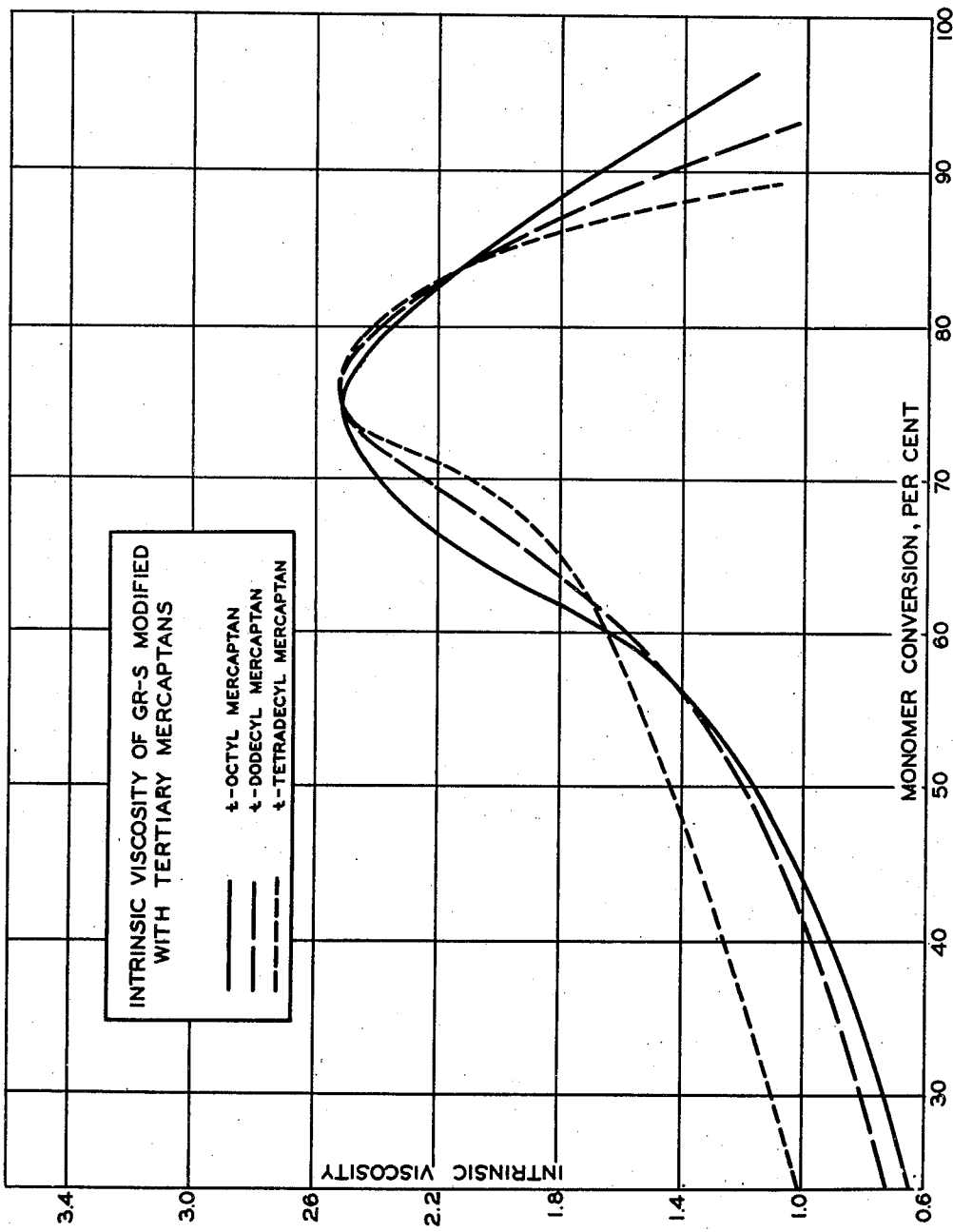

Tests carried out in the same manner were employed in obtaining the data for the polymers modified with a commercial primary $C_{12}$ mercaptan (Fig. 4) and with the tertiary $C_8$, $C_{12}$ and $C_{14}$ mercaptans (Fig. 3). The pronounced increase in polymer uniformity where tertiary-hexadecyl mercaptans are employed is conclusively demonstrated.

We claim:

1. In the production of synthetic rubber by emulsion copolymerization of a monomeric mixture of butadiene and styrene, the improvement which comprises copolymerizing a monomeric mixture containing butadiene and styrene in a weight ratio of 75 to 25 while present as a dispersed phase in an aqueous emulsion at 50° C.

in the presence of tertiary hexadecyl mercaptans as the sole modifying agents in an amount between 0.75 and 0.80 part per 100 parts of said monomers for a time to effect 77 per cent conversion, thereby producing a gel-free polymeric product the components of which have a uniform intrinsic viscosity, and recovering a resulting polymeric synthetic rubber so produced.

2. In the production of synthetic rubber by emulsion copolymerization of a monomeric mixture of butadiene and styrene, the improvement which comprises copolymerizing a monomeric mixture containing a major portion of butadiene and a minor portion of styrene while present as a dispersed phase in an aqueous emulsion in the presence of tertiary hexadecyl mercaptans as the sole modifying agents in an amount between 0.69 and 0.89 part per 100 parts of said monomers for a time to effect 40 to 80 per cent conversion, thereby producing a gel-free polymeric product the components of which have a uniform intrinsic viscosity, and recovering a resulting polymeric synthetic rubber so produced.

3. In a process for the production of synthetic rubber by emulsion copolymerization of a monomeric mixture of butadiene and styrene, the improvement which comprises copolymerizing a monomeric mixture containing a major portion of butadiene and a minor portion of styrene while present as a dispersed phase in an aqueous emulsion at a polymerization temperature, and in the presence of tertiary hexadecyl mercaptans as the sole polymerization modifying agents in an amount of at least 0.75 part per 100 parts by weight of said monomeric mixture, polymerizing said mixture for a time sufficient to effect conversion of 40 to 80 per cent of said monomeric mixture, thereby producing a gel-free polymeric product the components of which have a uniform intrinsic viscosity, and recovering a resulting polymeric synthetic rubber so produced.

WALTER A. SCHULZE.
WILLIE W. CROUCH.

REFERENCES CITED

The following references are of record in the file of this patent:

UNITED STATES PATENTS

| Number | Name | Date |
| --- | --- | --- |
| 2,281,613 | Wollthan et al. | May 5, 1942 |
| 2,376,030 | Olin | June 12, 1945 |
| 2,401,346 | Fryling | June 4, 1946 |